(12) United States Patent
Kabayama

(10) Patent No.: US 10,150,514 B2
(45) Date of Patent: Dec. 11, 2018

(54) VEHICULAR BODY STRUCTURE

(71) Applicant: Honda Motor Co., Ltd., Tokyo (JP)

(72) Inventor: Shohei Kabayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 15/393,414

(22) Filed: Dec. 29, 2016

(65) Prior Publication Data

US 2017/0197666 A1    Jul. 13, 2017

(30) Foreign Application Priority Data

Jan. 12, 2016    (JP) .................................. 2016-003370

(51) Int. Cl.
| | | |
|---|---|---|
| *B60N 99/00* | (2006.01) | |
| *B62D 25/20* | (2006.01) | |
| *B62D 21/10* | (2006.01) | |
| *B62D 27/02* | (2006.01) | |

(52) U.S. Cl.
CPC ......... *B62D 25/2009* (2013.01); *B62D 21/10* (2013.01); *B62D 25/2027* (2013.01); *B62D 25/2036* (2013.01); *B62D 27/02* (2013.01)

(58) Field of Classification Search
CPC ................ B62D 25/2009; B62D 21/10; B62D 25/2027; B62D 25/2036; B62D 27/02
See application file for complete search history.

(56) References Cited

U.S. PATENT DOCUMENTS

| | | | | |
|---|---|---|---|---|
| 2013/0229030 | A1* | 9/2013 | Yamaguchi | ............... B60K 1/04 296/193.07 |
| 2013/0341969 | A1* | 12/2013 | Fujii | .................. B62D 25/2036 296/193.07 |
| 2014/0300138 | A1* | 10/2014 | Gonda | ............... B62D 25/2027 296/187.12 |
| 2015/0042128 | A1* | 2/2015 | Kowaki | ............. B62D 25/2027 296/193.07 |

(Continued)

FOREIGN PATENT DOCUMENTS

| | | |
|---|---|---|
| JP | 3144502 B2 | 3/2001 |
| JP | 2003-137139 A | 5/2003 |

(Continued)

OTHER PUBLICATIONS

Office Action dated Sep. 6, 2017, issued in counterpart Japanese Application No. 2016-003370, with English translation (8 pages).

*Primary Examiner* — Lori L Lyjak
(74) *Attorney, Agent, or Firm* — Westerman, Hattori, Daniels & Adrian, LLP

(57) ABSTRACT

A tunnel reinforcing member is attached to a front floor tunnel. Second upper wall and second side walls of the tunnel reinforcing member are connected to a first upper wall and first side walls of the front floor tunnel, respectively, such that spaces are formed between second edge portions of the tunnel reinforcing member and first edge portions of the front floor tunnel. A rear portion of the first upper wall of the front floor tunnel faces a lower wall of a cross member with a kick-up part in between. A rear portion of the second upper wall of the tunnel reinforcing member inclines upwards and rearwards so as to be separated apart from the first upper wall of the front floor tunnel and faces a section reinforcing member fixed to the cross member with the kick-up part in between.

18 Claims, 6 Drawing Sheets

(56) References Cited

U.S. PATENT DOCUMENTS

| | | | | |
|---|---|---|---|---|
| 2015/0251705 A1* | 9/2015 | Mildner | ............... | B62D 25/20 |
| | | | | 296/187.08 |
| 2016/0159402 A1* | 6/2016 | Nakaya | ............... | B62D 25/20 |
| | | | | 296/193.02 |
| 2017/0073019 A1* | 3/2017 | Kabayama | ........... | B62D 21/155 |

FOREIGN PATENT DOCUMENTS

| JP | 2006-82720 A | 3/2006 |
|---|---|---|
| JP | 2006-96185 A | 4/2006 |
| JP | 2007-83754 A | 4/2007 |
| JP | 2015-54644 A | 3/2015 |

\* cited by examiner

VEHICULAR BODY STRUCTURE

CROSS REFERENCES TO RELATED APPLICATIONS

The present application claims priority under 35 U.S.C. § 119 to Japanese Patent Application No. 2016-003370, filed Jan. 12, 2016, entitled "Vehicular Body Structure." The contents of this application are incorporated herein by reference in their entirety.

TECHNICAL FIELD

The present disclosure relates to a vehicular body structure that increases rigidity of a vehicle body by reinforcing, with a tunnel reinforcing member, a kick-up part that is a bend portion between a front floor including a front floor tunnel and a rear floor.

BACKGROUND

A structure is known through Japanese Patent No. 3144502 in which a rear end of a front floor tunnel provided in a front floor is connected to a cross member provided on a back surface of a kick-up part of the front floor, and a connection between the front floor tunnel and the cross member is reinforced with a bulkhead cross member and a pair of stiffeners positioned on both sides of the bulkhead cross member in a vehicle width direction.

SUMMARY

Incidentally, in order to secure a leg space of an occupant and increase the riding comfort, the upper end of the front floor tunnel needs to be lower than the upper end of the kick-up part supporting the rear seat; however, conventionally, since the upper end of the front floor tunnel and the upper end of the kick-up part are arranged at substantially the same height, it is difficult to secure the leg space of the occupant. Furthermore, even when attempting to lower the upper end of the front floor tunnel with respect to the upper end of the kick-up part to secure the leg space of the occupant, disadvantageously, conventional structures do not allow the bulkhead cross member and the stiffeners that are reinforcing members to be disposed in a suitable manner.

The present disclosure in view of the above situation describes a vehicular body structure that is capable of increasing the rigidity of the vehicle body by effectively reinforcing the kick-up part while the upper end of the front floor tunnel is configured lower than the upper end of the kick-up part.

In order to provide the above structure, a first aspect of the embodiment proposes a vehicular body structure that includes a front floor, a front floor tunnel having an inverted U-shape cross section in which a pair of first side walls continuously extend at both ends of a first upper wall in a vehicle width direction while having a pair of first edge portions in between, the front floor tunnel extending in a front-rear direction at a middle portion of the front floor in the vehicle width direction, a kick-up part that erects upwards from a rear end of the front floor and above the first upper wall of the front floor tunnel, a rear floor that extends rearward from an upper end of the kick-up part, a cross member that extends in the vehicle width direction along a back surface of the kick-up part, and a tunnel reinforcing member having an inverted U-shape cross section in which a pair of second side walls continuously extend at both ends of a second upper wall in the vehicle width direction while having a pair of second edge portions in between, the tunnel reinforcing member reinforcing a connection between the front floor tunnel and the kick-up part. In the vehicular body structure, the second upper wall and the second side walls of the tunnel reinforcing member are connected to the first upper wall and the first side walls of the front floor tunnel, respectively, such that a space having a closed cross section is formed between each of the second edge portions of the tunnel reinforcing member and the corresponding one of the first edge portions of the front floor tunnel, a rear portion of the first upper wall of the front floor tunnel faces a lower wall of the cross member while having the kick-up part in between, and a rear portion of the second upper wall of the tunnel reinforcing member inclines upwards and rearwards so as to be separated from the first upper wall of the front floor tunnel, the rear portion facing a section reinforcing member fixed inside the cross member while having the kick-up part in between. With the above, the rigidity of the kick-up part that is a bend portion between the front floor and the rear floor can be effectively increased with the tunnel reinforcing member. Furthermore, by setting the upper end of the kick-up part higher than the first upper wall that is the upper end of the front floor tunnel, the leg space of the occupant on the rear seat can be secured and the riding comfort can be increased.

Furthermore, a second aspect of the embodiment proposes a vehicular body structure including the configuration of the first aspect in which, preferably, the cross member in rear view has an arch shape in which a middle portion in the vehicle width direction protrudes upwards. With the above, the cross member can be prevented from interfering with the front floor tunnel, and change in the cross-sectional area of the cross member in the vehicle width direction can be prevented from occurring.

Furthermore, a third aspect of the embodiment proposes a vehicular body structure including the configuration of the first aspect in which, preferably, a rear portion of the front floor tunnel includes inclining walls that incline outwards in the vehicle width direction from lower ends of the first side walls, the inclining walls continuously extending to the front floor. With the above, not only the rigidity of the bend portion between the front floor and the front floor tunnel can be increased with the inclining walls, but the accommodation capacity of the mounted components can be increased by increase in the width of the front floor tunnel in the vehicle width direction.

Furthermore, a fourth aspect of the embodiment proposes a vehicular body structure including the configuration of the third aspect in which, preferably, the inclining walls include swelling portions that swell towards the vehicle interior at portions connected to the kick-up part. With the above, the rigidity of the connection between the front floor and the kick-up part can be increased.

Furthermore, a fifth aspect of the embodiment proposes a vehicular body structure including the configuration of the first aspect in which, preferably, the rear floor includes a rear floor tunnel arranged behind the front floor tunnel in a straight line in top view. With the above, not only the rigidity of the vehicle body in the vicinity of the kick-up part can be increased, but the accommodation space of the mounted components can be secured below the rear floor.

Furthermore, a sixth aspect of the embodiment proposes a vehicular body structure including the configuration of the first aspect in which, preferably, two end portions of the lower wall of the cross member in the vehicle width direction includes first end portion flanges that are connected to the rear end of the front floor, and second end portion flanges that are connected to rear ends of side sills. With the above, the rigidity of the vehicle body can be increased by firmly connecting the two end portions of the cross member in the vehicle width direction to the rear end of the front floor and the rear ends of the side sills.

Furthermore, a seventh aspect of the embodiment proposes a vehicular body structure including the configuration of the first aspect in which, preferably, a pair of floor frames that extend in the front-rear direction along two sides of the front floor tunnel in the vehicle width direction are connected to an upper surface of the front floor, and rear portions of the floor frames are connected to the kick-up part through first inclining portions that incline upwards. The floor frame is capable of increasing the rigidity of the front floor and, in particular, the first inclining portions of the floor frame can increase the rigidity of the bend portion from the front floor to the kick-up part.

Furthermore, an eighth aspect of the embodiment proposes a vehicular body structure including the configuration of the seventh aspect in which, preferably, the front floor includes second inclining portions that incline along undersides of the first inclining portions of the floor frames. With the above, the rear end of the front floor can be disposed close to the underside of the cross member to increase the rigidity of the vehicle body.

Furthermore, a ninth aspect of the embodiment proposes a vehicular body structure including the configuration of the seventh aspect in which, preferably, the rear portions of the floor frames and a rear side frame are connected to each other with braces. The brace is capable of increasing the rigidity of the vehicle body.

Furthermore, a tenth aspect of the embodiment proposes a vehicular body structure including the configuration of the seventh aspect in which, preferably, recessed portions each in which a harness is disposed are formed between step portions formed in the front floor and side walls of the floor frames. With the above, the protection and wiring of the harnesses are facilitated.

Furthermore, an eleventh aspect of the embodiment proposes a vehicular body structure including the configuration of the first aspect in which, preferably, the front floor is divided into a front side floor body portion and a rear side floor extension portion. With the above, a vehicle body with a long vehicle length can be manufactured by using the floor extension portion, and a vehicle body with a short vehicle length can be manufactured by not using the floor extension portion; accordingly, compared with preparing two types of floor panels that have different lengths, the manufacturing cost can be reduced.

Furthermore, a twelfth aspect of the embodiment proposes a vehicular body structure including the configuration of the first aspect in which, preferably, the front floor includes tunnel frames that extend in the front-rear direction along outer sides of the front floor tunnel in the vehicle width direction. The rigidity of the front floor can be increased with the tunnel frame.

For example, the front brace 27 in the exemplary embodiment corresponds to the brace in the present disclosure.

BRIEF DESCRIPTION OF THE DRAWINGS

The advantages of the disclosure will become apparent in the following description taken in conjunction with the following drawings.

DETAILED DESCRIPTION

Hereinafter, an exemplary embodiment of the present disclosure will be described with reference to FIGS. 1 to 6. Note that the front-rear direction, the left-right direction (a vehicle width direction), and the up-down direction in the present description are directions defined on the basis of an occupant sitting in the driver seat.

Figure 1:
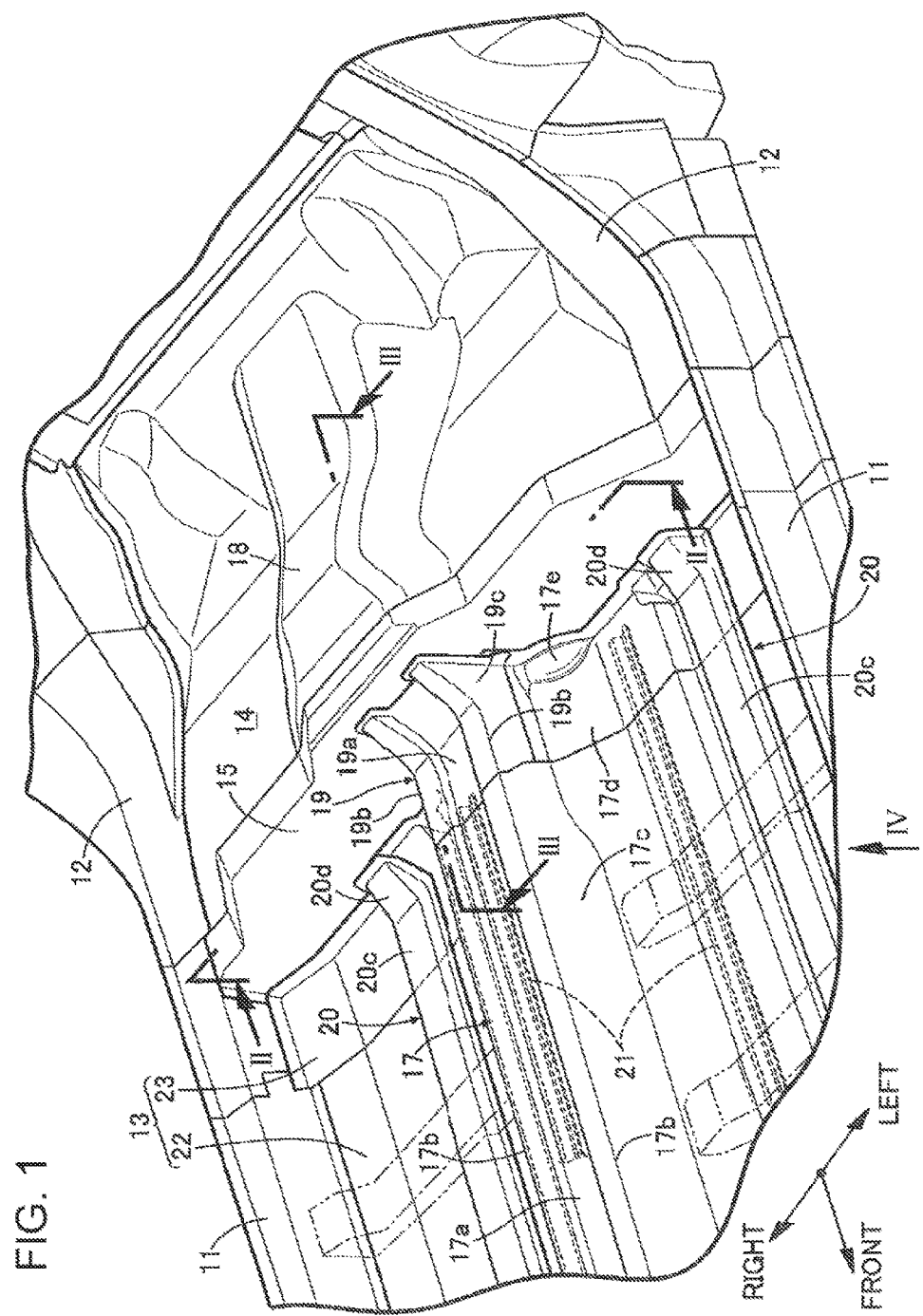
FIG. 1 is a perspective view of a floor of a rear portion of a vehicle body of a vehicle.

As illustrated in FIG. 1, a pair of left and right side sills 11 and 11 are disposed along both left and right sides of the vehicle extending in the front-rear direction, and front ends of a pair of left and right rear side frames 12 and 12 that extend in the front-rear direction are connected to rear ends of the side sills 11 and 11. The left and right side sills 11 and 11 are connected to each other via a front floor 13 constituting a floor surface of the vehicle interior, and the left and right rear side frames 12 and 12 are connected to each other via a rear floor 14 constituting a lower portion of a floor surface of a rear seat and a floor surface of a luggage room. A front end of the rear floor 14, interposing a kick-up part 15 erecting upwards between itself and the front floor 13, is positioned a step higher than a rear end of the front floor 13, and a cross member 16 that connects, in the vehicle width direction, the right and left connections between the left and right side sills 11 and 11 and the left and right rear side frames 12 and 12 is disposed at the back surface of the kick-up part 15 (see FIGS. 3 to 5).

At a middle portion of the front floor 13 in the vehicle width direction, a front floor tunnel 17 that extends in the front-rear direction and in which a rear end thereof is connected to a front side of the kick-up part 15 is formed so as to swell upwards, and, at a middle portion of the rear floor 14 in the vehicle width direction, a rear floor tunnel 18 that extends in the front-rear direction and in which a front end thereof faces a rear end of the front floor tunnel 17 is formed so as to swell upwards. A portion in which the rear end of the front floor tunnel 17 is connected to the kick-up part 15 is reinforced with a tunnel reinforcing member 19. A pair of left and right floor frames 20 and 20 that extend in the front-rear direction are disposed on upper surfaces of the front floor 13 between the left and right side sills 11 and 11 and the front floor tunnel 17 respectively and, furthermore, a pair of left and right tunnel frames 21 and 21 that extend in the front-rear direction are disposed on undersides of the front floor 13 between the front floor tunnel 17 and the left and right floor frames 20 and 20, respectively.

Figure 3:
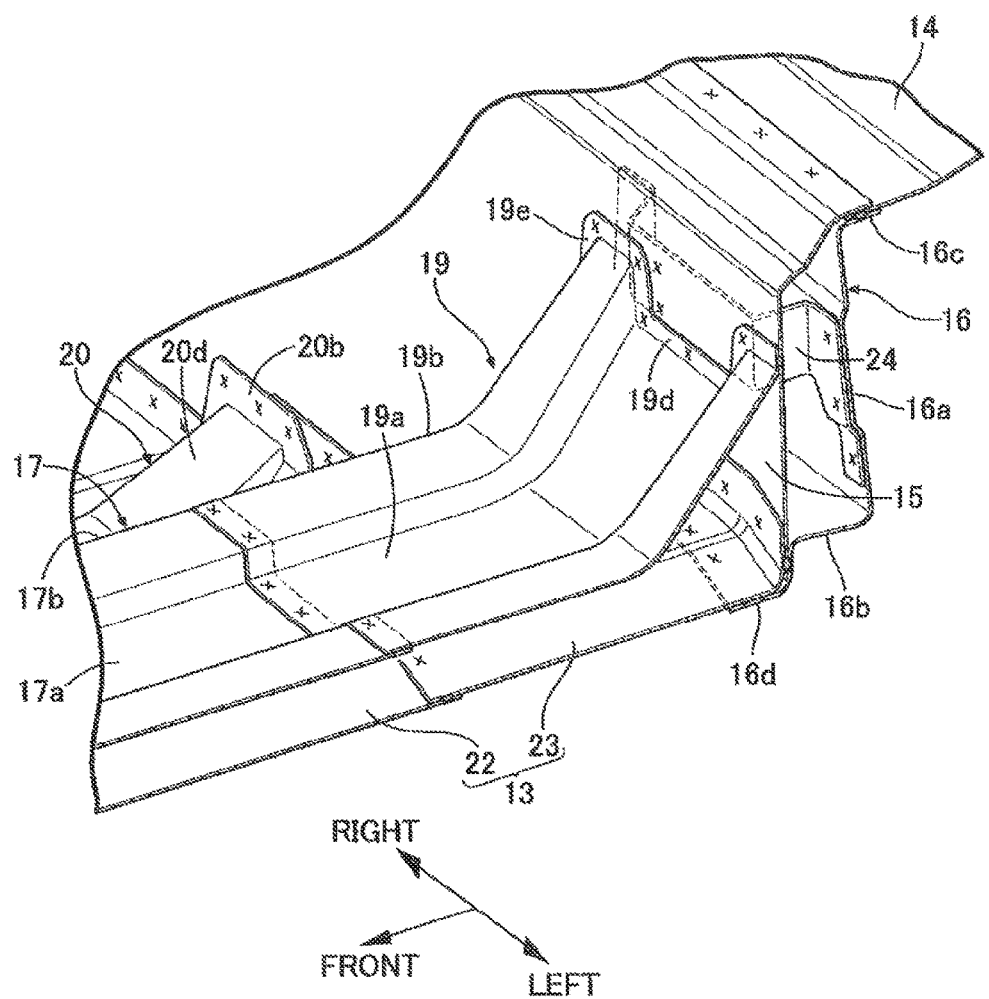
FIG. 3 is a cross-sectional view taken along line in FIG. 1.

As illustrated in FIG. 3, the front floor 13 is formed of a floor body portion 22 positioned on the front side and a floor extension portion 23 on the rear side that is connected to the floor body portion 22 and that integrally includes the kick-up part 15. The floor extension portion 23 is, in FIGS. 4 and 5, cross hatched. An upper flange 16c formed on an upper end of the rear wall 16a is connected to the front end of the rear floor 14, and a lower flange 16d formed on a front end of the lower wall 16b is connected to an edge portion of the lower end of the kick-up part 15 such that the cross member 16 that includes a rear wall 16a and a lower wall 16b and that is formed so as to have a L-shaped cross-section works together with the kick-up part 15 to constitute a closed cross section. Furthermore, a pair of left and right first end portion flanges 16e and 16e connected to the underside of the front floor 13 and a pair of left and right second end portion flanges 16f and 16f connected to the undersides of the left and right side sills 11 and 11 are provided in the two end portions of the cross member 16 in the vehicle width direction (see FIG. 5).

Figure 5:
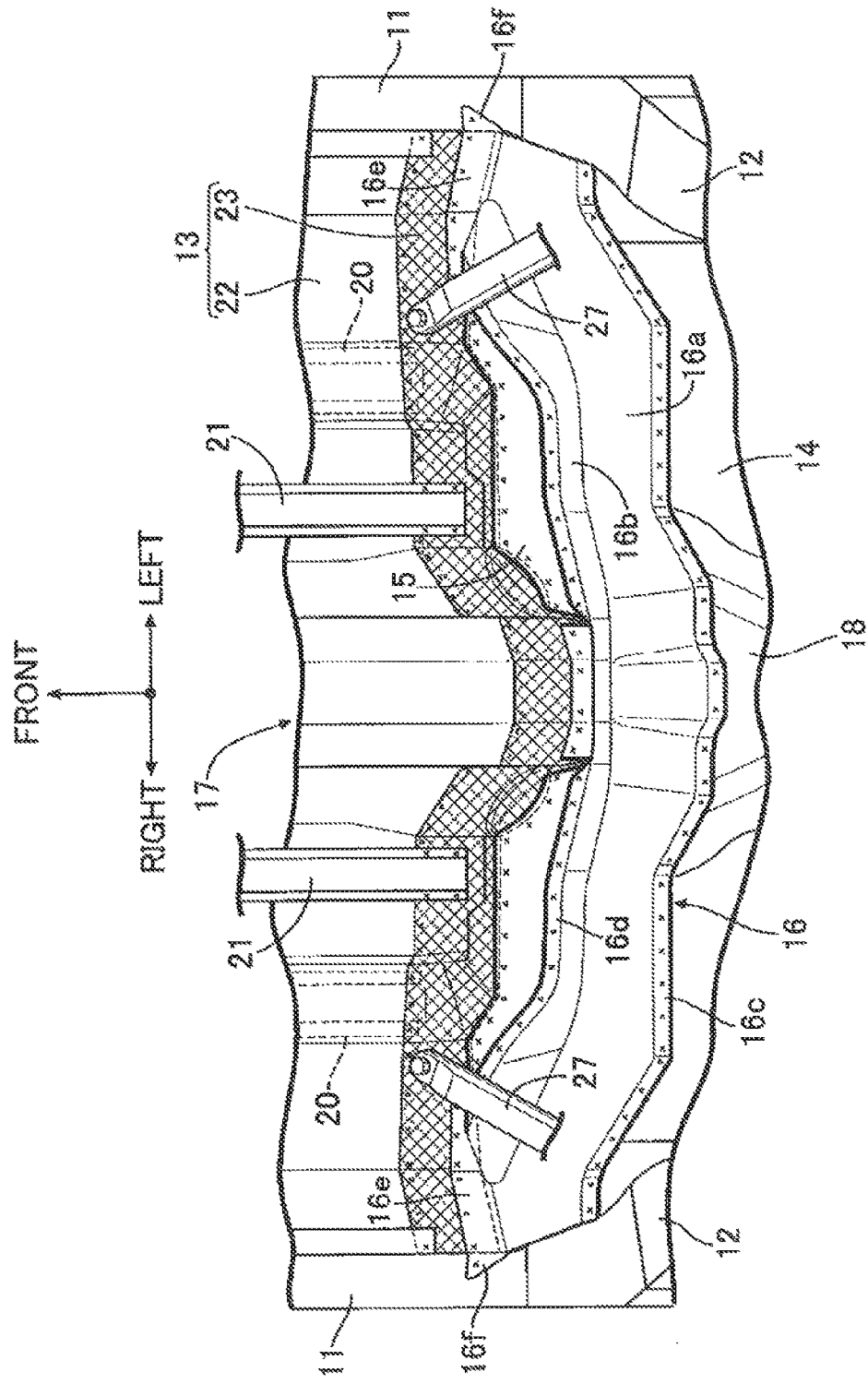
FIG. 5 is a figure viewed in an arrow V direction in FIG. 4.
Figure 6:
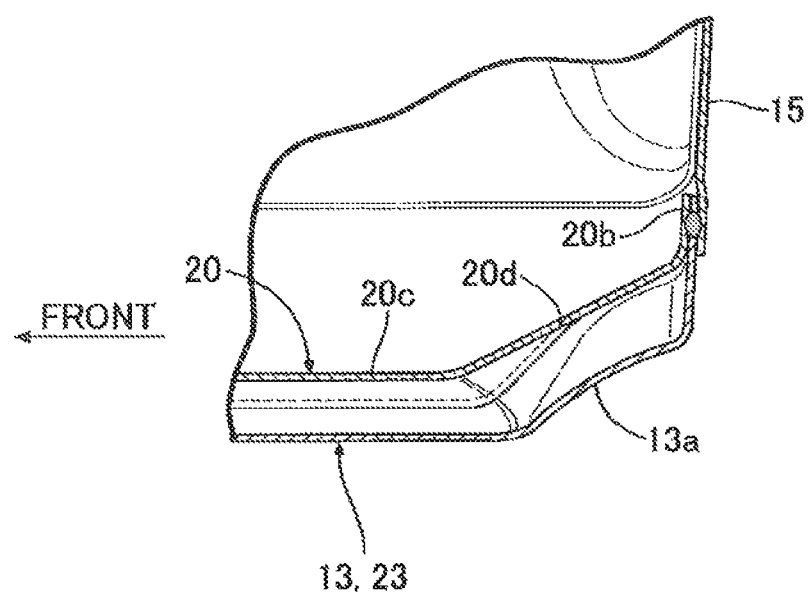
FIG. 6 is a cross-sectional view taken along line VI-VI in FIG. 2.

As illustrated in FIGS. 1 and 5, an upper surface of the kick-up part 15 is, in front view, formed in an arch-shape such that a middle portion thereof in the vehicle width direction is higher, and the cross member 16 disposed so as to extend along the upper surface of the kick-up part 15 is, in front view, also formed in an arch-shape such that a middle portion thereof in the vehicle width direction is higher.

Figure 2:
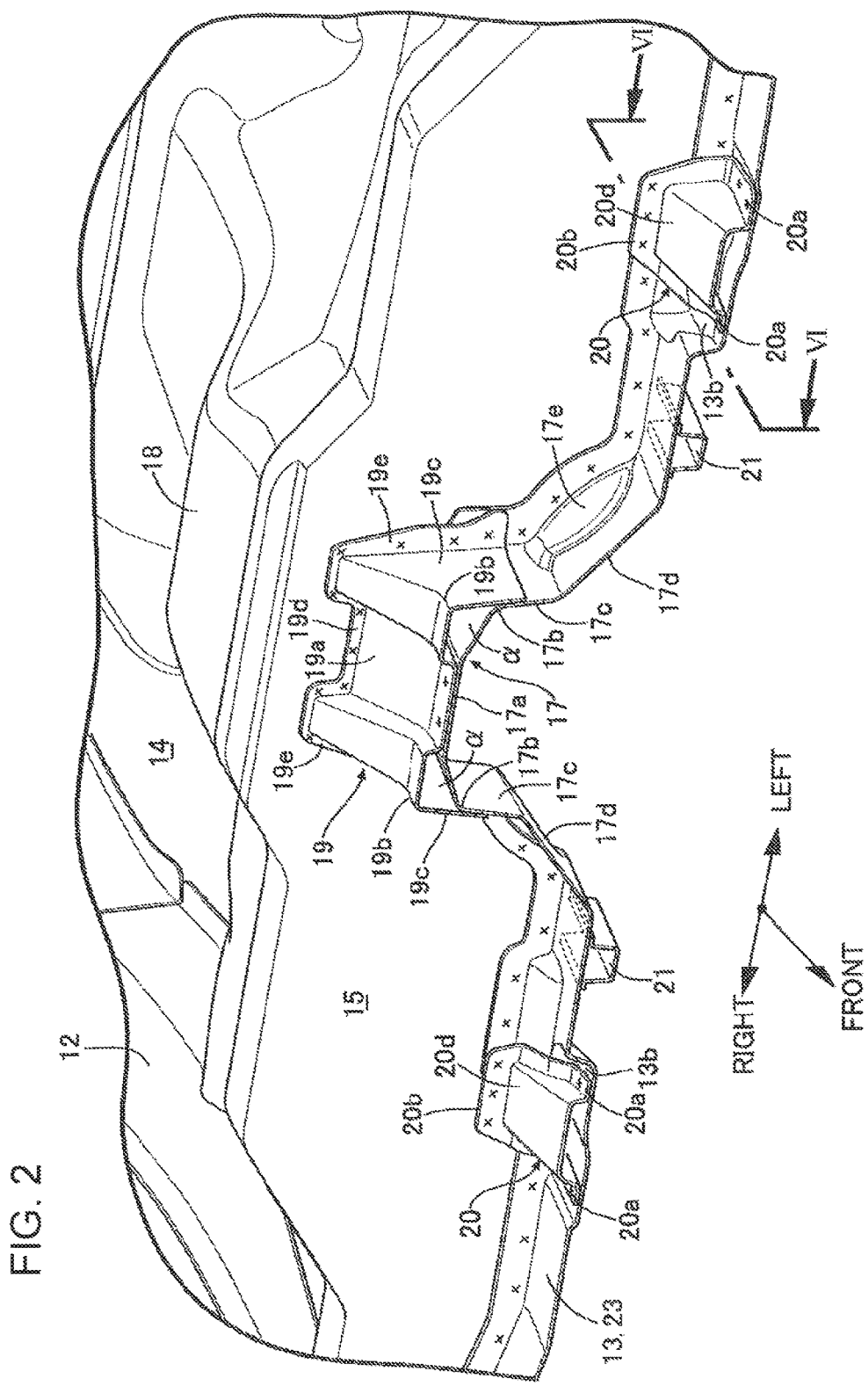
FIG. 2 is a cross-sectional view taken along line II-II in FIG. 1.

As illustrated in FIGS. 1 to 3, the front floor tunnel 17 that swells upwards in an inverted U-shape from the front floor 13 includes a first upper wall 17a constituting the upper surface thereof, and a pair of left and right first side walls 17c and 17c that extend, in a continuous manner to the front floor 13, downwards from a pair of left and right first edge portions 17b and 17b at both ends of the first upper wall 17a in the vehicle width direction. An upper end of the kick-up part 15 is position higher than the upper end of the first upper wall 17a that is an upper end of the front floor tunnel 17. The tunnel reinforcing member 19 that reinforces a portion where the rear end of the front floor tunnel 17 is connected to the front side of the kick-up part 15 includes a second upper wall 19a and left and right second side walls 19c and 19c that are overlapped on and are welded to the first upper wall 17a of the front floor tunnel 17 and the left and right first side walls 17c and 17c from above and from the outside in the vehicle width direction such that spaces α(see FIG. 2) each with a closed cross section are formed between the left and right first edge portions 17b and 17b of the front floor tunnel 17 and left and right second edge portions 19b and 19b of the tunnel reinforcing member 19.

The rear ends of the second upper wall 19a and the left and right second side walls 19c and 19c of the tunnel reinforcing member 19 continually extend to flanges 19d, 19e, and 19e that are bent upwards or towards the outside in the vehicle width direction. The flanges 19d, 19e, and 19e are welded to the front side of the kick-up part 15. The second upper wall 19a of the tunnel reinforcing member 19 inclines upwards as the second upper wall 19a extends towards the rear; accordingly, heights of the spaces α, each having a closed cross section, that are formed with the front floor tunnel 17 becomes higher as the spaces α extend towards the rear.

A section reinforcing member 24 (see FIG. 3) that reinforces the closed cross section is disposed inside the cross member 16 provided on the back surface of the kick-up part 15 connected to the front floor 13. The section reinforcing member 24 faces the flange 19d at the rear end of the tunnel reinforcing member 19 while having the kick-up part 15 in between.

Figure 4:
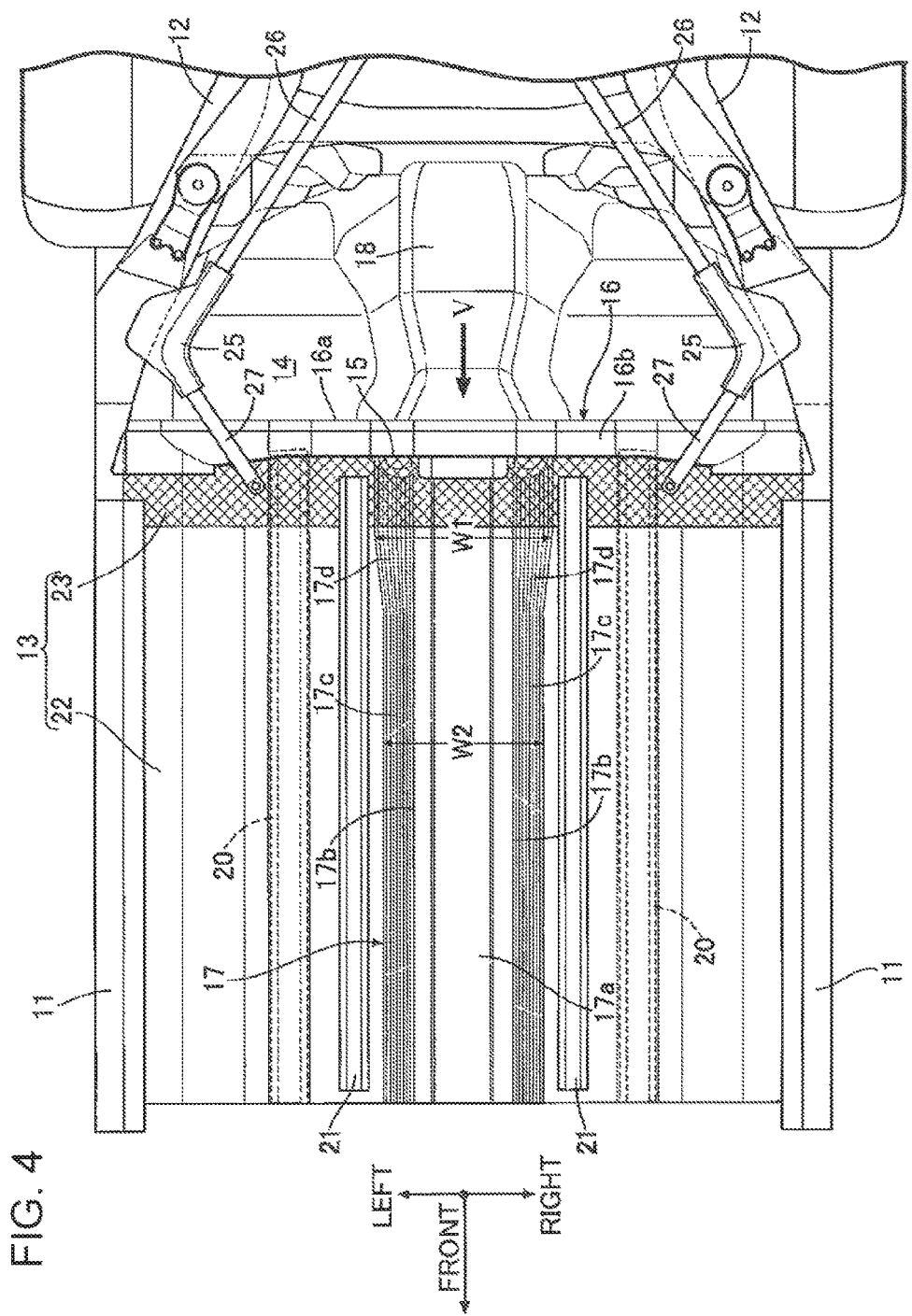
FIG. 4 is a figure viewed in an arrow IV direction in FIG. 1.

Lower ends of the left and right first side walls 17c and 17c at a rear portion of the front floor tunnel 17 constitute left and right inclining walls 17d and 17d that incline towards the outside in the vehicle width direction; accordingly, regarding the width of the front floor tunnel 17 in the vehicle width direction, a width W1 of a portion including the left and right inclining walls 17d and 17d are larger than a width W2 of a portion not including the left and right inclining walls 17d and 17d (see FIG. 4). Furthermore, left and right swelling portions 17e and 17e (see FIG. 2) that swell towards the vehicle interior side are formed at portions where the rear ends of the left and right inclining walls 17d and 17d are in contact with the kick-up part 15.

In floor frames 20 and 20 that each have a hat-shaped cross section that open downwards, flanges 20a and 20a that are formed on both left and right edges of each floor frame 20 are welded to the upper surfaces of the front floor 13, and a flange 20b formed at a rear end portion of each floor frame 20 is welded to the front side of the kick-up part 15. While rear portions of upper walls 20c and 20c of the floor frames 20 and 20 include first inclining portions 20d and 20d that incline upwards, a rear end portion of the front floor 13 also includes second inclining portions 13a and 13a in which the rear sides incline upwards towards the first inclining portions 20d and 20d of the floor frames 20 and 20 (see FIG. 6).

As illustrated in FIGS. 1 and 2, groove-shaped recessed portions 13b and 13b that are open upwards and that extend in the front-rear direction are formed between the inner walls of the floor frames 20 and 20 extending in the vehicle width direction and step portions of the front floor 13. Harnesses (not shown) are accommodated in the recessed portions 13b and 13b.

As illustrated in FIGS. 4 and 5, a pair of left and right brackets 25 and 25 are provided on the front portions of the undersides of the left and right rear side frames 12 and 12, a pair of left and right rear braces 26 and 26 extending from the left and right brackets 25 and 25 towards the rear and towards the inside in the vehicle width direction are connected to rear portions of the rear floor 14, and a pair of left and right front braces 27 and 27 extending from the left and right brackets 25 and 25 towards the front and towards the inside in the vehicle width direction are connected to rear ends of the left and right floor frames 20 and 20 provided on the front floor 13.

Operation and effects of the exemplary embodiment of the present disclosure having the configuration described above will be described next.

Since the front floor 13 and the rear floor 14 are connected through the kick-up part 15 that is a bend portion of the vehicle body, the rigidity of the vehicle body may decrease in the portion of the kick-up part 15. While the front floor tunnel 17 can effectively reinforce the kick-up part 15 and increase the rigidity of the vehicle body by increasing the disposed height of the first upper wall 17a of the front floor tunnel 17 of the front floor 13 and connecting the first upper wall 17a to the upper end of the kick-up part 15; however, when the disposed height of the first upper wall 17a of the front floor tunnel 17 is increased, disadvantageously, a leg space of an occupant sitting on the rear seat supported on the kick-up part 15 is decreased by the front floor tunnel 17 and the comfort in sitting on the rear seat is decreased.

The present exemplary embodiment is capable of increasing the rigidity of the vehicle body by reinforcing the connection between the front floor tunnel 17 and the kick-up part 15 with the tunnel reinforcing member 19 while obtaining the comfort in sitting on the rear seat by positioning the first upper wall 17a of the front floor tunnel 17 lower than the upper end of the kick-up part 15.

In other words, the rigidity of the kick-up part 15 that is the bend portion between the front floor 13 and the rear floor 14 can be effectively increased by connecting the second upper wall 19a and the second side walls 19c and 19c of the tunnel reinforcing member 19 to the first upper wall 17a and the first side walls 17c and 17c of the front floor tunnel 17, respectively, and forming spaces α having closed cross sections between the second edge portions 19b and 19b of the tunnel reinforcing member 19 and the first edge portions 17b and 17b of the front floor tunnel 17, and by inclining the rear portion of the second upper wall 19a of the tunnel reinforcing member 19 upwards and rearwards so as to be separated from the first upper wall 17a of the front floor tunnel 17 and having the rear end of the second upper wall 19a of the tunnel reinforcing member 19 to face, with the kick-up part 15 in between, the section reinforcing member 24 fixed inside the cross member 16.

Furthermore, since the rear portion of the front floor tunnel 17 includes the inclining walls 17d and 17d that incline towards the outside in the vehicle width direction from the lower ends of the first side walls 17c and 17c and that continually extend to the front floor 13, not only the rigidity of the bend portion between the front floor 13 and the front floor tunnel 17 can be increased with the inclining walls 17d and 17d, but the accommodation capacity of the mounted components can be increased by increase in the width of the front floor tunnel 17 in the vehicle width direction. Moreover, since the inclining walls 17d and 17d of the front floor tunnel 17 include, at the portion connected with the kick-up part 15, swelling portions 17e and 17e that swell towards the vehicle interior side, the rigidity of the connection between the front floor 13 and the kick-up part 15 is increased further.

Furthermore, since the rear floor 14 includes the rear floor tunnel 18 that is arranged behind the front floor tunnel 17 in a straight line in top view, not only the rigidity of the vehicle body in the vicinity of the kick-up part 15 is further increased with the rear floor tunnel 18, but a space below the rear floor 14 for accommodating the mounted components can be secured. Moreover, since the cross member 16 that reinforces the kick-up part 15 has an arch shape in which, when in rear view, the middle portion in the vehicle width direction protrudes upwards, the cross member 16 can be prevented from interfering with the front floor tunnel 17, and change in the cross-sectional area of the cross member 16 in the vehicle width direction can be prevented from occurring.

Furthermore, since the two end portions of the lower wall 16b of the cross member 16 in the vehicle width direction include first end portion flanges 16e and 16e connected to the rear end of the front floor 13, and the second end portion flanges 16f and 16f connected to the rear ends of the side sills 11 and 11, the rigidity of the vehicle body can be increased by firmly connecting the two end portions of the cross member 16 in the vehicle width direction to the rear end of the front floor 13 and to the rear ends of the side sills 11 and 11.

Furthermore, since the pair of floor frames 20 and 20 that extend in the front-rear direction along the two sides of the front floor tunnel 17 in the vehicle width direction are connected to the upper surface of the front floor 13, and the rear ends of the floor frames 20 and 20 are connected to the kick-up part 15 through the first inclining portions 20d and 20d that incline upwards, the rigidity of the front floor 13 can be increased with the floor frames 20 and 20 and, especially, the rigidity of the bend portion from the front floor 13 to the kick-up part 15 can be increased with the first inclining portions 20d and 20d of the floor frames 20 and 20. Moreover, since the front floor 13 includes the second inclining portions 13a and 13a that incline along the underside of the first inclining portions 20d and 20d of the floor frames 20 and 20, the rear end of the front floor 13 can be disposed near the underside of the cross member 16 and the rigidity of the vehicle body can be increased.

Furthermore, since the recessed portions 13b and 13b in which the harnesses are disposed are formed between the step portions formed in the front floor 13 and the side walls of the floor frames 20 and 20, protection and wiring of the harnesses are facilitated.

Furthermore, since the rear ends of the floor frames 20 and 20 and the rear side frames 12 and 12 are connected to each other with the front braces 27 and 27, the rigidity of the vehicle body can be increased with the front braces 27 and 27. Since the front floor 13 includes the tunnel frames 21 and 21 that extend in the front-rear direction along the outsides of the front floor tunnel 17 in the vehicle width direction, the rigidity of the front floor 13 is increased with the tunnel frames 21 and 21.

Furthermore, since the front floor 13 is divided into the floor body portion 22 at the front and the floor extension portion 23 at the rear, a vehicle body with a long vehicle length can be manufactured by connecting the floor extension portion 23 to the floor body portion 22, and a vehicle body with a short vehicle length can be manufactured by not connecting the floor extension portion 23 to the floor body portion 22. With the above, compared with preparing two types of floor panels that have different lengths, the manufacturing cost can be reduced.

While the exemplary embodiment of the present disclosure has been described above, various design changes can be made to the present disclosure without departing from the scope of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicular body structure comprising:
   a front floor;
   a front floor tunnel disposed at a substantially middle portion of the front floor in a vehicle width direction and extending in a front-rear direction, the front floor tunnel having an inverted U-shape cross section comprising a first upper wall and a pair of first side walls continuously extend from both side ends in the vehicle width direction of the first upper wall via a pair of first corners located at the both side ends of the first upper wall;
   a kick-up part that erects and extends upwards from a rear end of the front floor above the first upper wall of the front floor tunnel;
   a rear floor that extends rearward from an upper end of the kick-up part;
   a cross member that extends in the vehicle width direction along a rear surface of the kick-up part; and
   a tunnel reinforcing member reinforcing a connection portion between the front floor tunnel and the kick-up part, the tunnel reinforcing member having an inverted U-shape cross section comprising a second upper wall and a pair of second side walls continuously extend from both side ends in the vehicle width direction of the second upper wall via a pair of second corners located at the both side ends of the second upper wall,
   wherein the second upper wall and the second side walls of the tunnel reinforcing member are connected to the first upper wall and the first side walls of the front floor tunnel, respectively, such that a space having a closed cross section is formed between each of the second corners of the tunnel reinforcing member and the corresponding one of the first corners of the front floor tunnel, wherein a rear portion of the first upper wall of the front floor tunnel is opposite to a lower wall of the cross member while having the kick-up part therebetween, wherein a rear portion of the second upper wall of the tunnel reinforcing member inclines upwards and rearwards so as to be separated apart from the first upper wall of the front floor tunnel, the rear portion is opposite to a section reinforcing member fixed to the cross member while having the kick-up part therebetween, and wherein the cross member in rear view has an arch shape in which a middle portion in the vehicle width direction protrudes upwards.

2. The vehicular body structure according to claim 1, wherein a rear portion of the front floor tunnel includes inclining walls that incline outwards in the vehicle width direction from lower ends of the first side walls, respectively, the inclining walls continuously extending to the front floor.

3. The vehicular body structure according to claim 2, wherein the inclining walls are connected to the kick-up part, respectively, the inclining walls including swelling portions that swell towards the vehicle interior at portions connected to the kick-up part, respectively.

4. The vehicular body structure according to claim 1, wherein the rear floor includes a rear floor tunnel aligned linearly with and behind the front floor tunnel in top view.

5. The vehicular body structure according to claim 1, wherein the lower wall of the cross member includes, at respective side ends in the vehicle width direction, a first end portion flange connected to the rear end of the front floor, and a second end portion flange connected to a rear end of a side sill.

6. The vehicular body structure according to claim 1, wherein a pair of floor frames that extend in the front-rear direction along both sides of the front floor tunnel in the vehicle width direction are connected to an upper surface of the front floor, and wherein a rear portion of the respective floor frames includes a first inclining portion that inclines upwards and is connected to the kick-up part.

7. The vehicular body structure according to claim 6, wherein the front floor includes a second inclining portion that inclines along underside of the first inclining portion of the respective floor frames.

8. The vehicular body structure according to claim 6, wherein the rear portion of the respective floor frames and a rear side frame are connected to each other with a brace.

9. The vehicular body structure according to claim 6, wherein the front floor includes a recessed portion to store a harness, the recessed portion being formed between a step portion formed in the front floor and a side wall of the respective floor frames.

10. The vehicular body structure according to claim 1, wherein the front floor is divided into a front side floor body portion and a rear side floor extension portion.

11. The vehicular body structure according to claim 1, wherein the front floor includes tunnel frames that extend in the front-rear direction along outer sides of the front floor tunnel in the vehicle width direction, respectively.

12. The vehicular body structure according to claim 1, wherein the tunnel reinforcing member is disposed on and above the front floor tunnel, a front end of the tunnel reinforcing member has a cross sectional shape conforming to a cross sectional shape of the front floor tunnel, and the space between each of the second corners and the corresponding one of the first corners becomes larger toward rear direction of the tunnel reinforcing member.

13. The vehicular body structure according to claim 3, wherein the swelling portions extend in the vehicle width direction, respectively.

14. A vehicle comprising the vehicular body structure according to claim 1.

15. A vehicular body structure comprising:

a front floor;

a front floor tunnel disposed at a substantially middle portion of the front floor in a vehicle width direction and extending in a front-rear direction, the front floor tunnel having an inverted U-shape cross section comprising a first upper wall and a pair of first side walls continuously extend from both side ends in the vehicle width direction of the first upper wall via a pair of first corners located at the both side ends of the first upper wall;

a kick-up part that erects and extends upwards from a rear end of the front floor above the first upper wall of the front floor tunnel;

a rear floor that extends rearward from an upper end of the kick-up part;

a cross member that extends in the vehicle width direction along a rear surface of the kick-up part; and a tunnel reinforcing member reinforcing a connection portion between the front floor tunnel and the kick-up part, the tunnel reinforcing member having an inverted U-shape cross section comprising a second upper wall and a pair of second side walls continuously extend from both side ends in the vehicle width direction of the second upper wall via a pair of second corners located at the both side ends of the second upper wall, wherein the second upper wall and the second side walls of the tunnel reinforcing member are connected to the first upper wall and the first side walls of the front floor tunnel, respectively, such that a space having a closed cross section is formed between each of the second corners of the tunnel reinforcing member and the corresponding one of the first corners of the front floor tunnel, wherein a rear portion of the first upper wall of the front floor tunnel is opposite to a lower wall of the cross member while having the kick-up part therebetween, wherein a rear portion of the second upper wall of the tunnel reinforcing member inclines upwards and rearwards so as to be separated apart from the first upper wall of the front floor tunnel, the rear portion is opposite to a section reinforcing member fixed to the cross member while having the kick-up part therebetween, wherein a pair of floor frames that extend in the front-rear direction along both sides of the front floor tunnel in the vehicle width direction are connected to an upper surface of the front floor, wherein a rear portion of the respective floor frames includes a first inclining portion that inclines upwards and is connected to the kick-up part, and wherein the rear portion of the respective floor frames and a rear side frame are connected to each other with a brace.

16. A vehicular body structure comprising:
a front floor;
a front floor tunnel disposed at a substantially middle portion of the front floor in a vehicle width direction and extending in a front-rear direction, the front floor tunnel having an inverted U-shape cross section comprising a first upper wall and a pair of first side walls continuously extend from both side ends in the vehicle width direction of the first upper wall via a pair of first corners located at the both side ends of the first upper wall;
a kick-up part that erects and extends upwards from a rear end of the front floor above the first upper wall of the front floor tunnel;
a rear floor that extends rearward from an upper end of the kick-up part;
a cross member that extends in the vehicle width direction along a rear surface of the kick-up part; and
a tunnel reinforcing member reinforcing a connection portion between the front floor tunnel and the kick-up part, the tunnel reinforcing member having an inverted U-shape cross section comprising a second upper wall and a pair of second side walls continuously extend from both side ends in the vehicle width direction of the second upper wall via a pair of second corners located at the both side ends of the second upper wall,
wherein the second upper wall and the second side walls of the tunnel reinforcing member are connected to the first upper wall and the first side walls of the front floor tunnel, respectively, such that a space having a closed cross section is formed between each of the second corners of the tunnel reinforcing member and the corresponding one of the first corners of the front floor tunnel,
wherein a rear portion of the first upper wall of the front floor tunnel is opposite to a lower wall of the cross member while having the kick-up part therebetween,
wherein a rear portion of the second upper wall of the tunnel reinforcing member inclines upwards and rearwards so as to be separated apart from the first upper wall of the front floor tunnel, the rear portion is opposite to a section reinforcing member fixed to the cross member while having the kick-up part therebetween,
wherein a pair of floor frames that extend in the front-rear direction along both sides of the front floor tunnel in the vehicle width direction are connected to an upper surface of the front floor,
wherein a rear portion of the respective floor frames includes a first inclining portion that inclines upwards and is connected to the kick-up part, and
wherein the front floor includes a recessed portion to store a harness, the recessed portion being formed between a step portion formed in the front floor and a side wall of the respective floor frames.

17. A vehicular body structure comprising:
a front floor;
a front floor tunnel disposed at a substantially middle portion of the front floor in a vehicle width direction and extending in a front-rear direction, the front floor tunnel having an inverted U-shape cross section comprising a first upper wall and a pair of first side walls continuously extend from both side ends in the vehicle width direction of the first upper wall via a pair of first corners located at the both side ends of the first upper wall;
a kick-up part that erects and extends upwards from a rear end of the front floor above the first upper wall of the front floor tunnel;
a rear floor that extends rearward from an upper end of the kick-up part;
a cross member that extends in the vehicle width direction along a rear surface of the kick-up part; and
a tunnel reinforcing member reinforcing a connection portion between the front floor tunnel and the kick-up part, the tunnel reinforcing member having an inverted U-shape cross section comprising a second upper wall and a pair of second side walls continuously extend from both side ends in the vehicle width direction of the second upper wall via a pair of second corners located at the both side ends of the second upper wall,
wherein the second upper wall and the second side walls of the tunnel reinforcing member are connected to the first upper wall and the first side walls of the front floor tunnel, respectively, such that a space having a closed cross section is formed between each of the second corners of the tunnel reinforcing member and the corresponding one of the first corners of the front floor tunnel,
wherein a rear portion of the first upper wall of the front floor tunnel is opposite to a lower wall of the cross member while having the kick-up part therebetween,
wherein a rear portion of the second upper wall of the tunnel reinforcing member inclines upwards and rearwards so as to be separated apart from the first upper wall of the front floor tunnel, the rear portion is opposite to a section reinforcing member fixed to the cross member while having the kick-up part therebetween,
wherein a rear portion of the front floor tunnel includes inclining walls that incline outwards in the vehicle width direction from lower ends of the first side walls, respectively, the inclining walls continuously extending to the front floor, and
wherein the inclining walls are connected to the kick-up part, respectively, the inclining walls including swelling portions that swell towards the vehicle interior at portions connected to the kick-up part, respectively.

18. The vehicular body structure according to claim 17, wherein the swelling portions extend in the vehicle width direction, respectively.

* * * * *